United States Patent
Takeshima

(10) Patent No.: US 9,884,770 B2
(45) Date of Patent: Feb. 6, 2018

(54) AMMONIA SYNTHESIS METHOD

(71) Applicant: Shinichi Takeshima, Numazu (JP)

(72) Inventor: Shinichi Takeshima, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 14/905,355

(22) PCT Filed: Aug. 8, 2013

(86) PCT No.: PCT/JP2013/071555
§ 371 (c)(1),
(2) Date: Jan. 15, 2016

(87) PCT Pub. No.: WO2015/019473
PCT Pub. Date: Feb. 12, 2015

(65) Prior Publication Data
US 2016/0152483 A1 Jun. 2, 2016

(51) Int. Cl.
*C01C 1/04* (2006.01)
*C01B 3/02* (2006.01)
*C01B 3/04* (2006.01)

(52) U.S. Cl.
CPC ............ *C01C 1/04* (2013.01); *C01B 3/025* (2013.01); *C01B 3/042* (2013.01); *C01C 1/0405* (2013.01);
(Continued)

(58) Field of Classification Search
None
See application file for complete search history.

(56) References Cited

U.S. PATENT DOCUMENTS 3,925,212 A * 12/1975 Tchernev ............... C25B 1/003
                                                          204/278
4,030,890 A *  6/1977 Diggs .................... B01J 7/02
                                                          126/573
(Continued)

FOREIGN PATENT DOCUMENTS

JP      S61-153136 A    7/1986
JP      H11-166996 A    6/1999
(Continued)

OTHER PUBLICATIONS

A. Giaconia et al. "Hydrogen/methanol production by sulfur-iodine thermochemical cycle powered by combined solar/fossil energy" International Journal of Hydrogen Energy 32, 2007, pp. 469-481.
(Continued)

*Primary Examiner* — Wayne Langel
(74) *Attorney, Agent, or Firm* — Oliff PLC

(57) ABSTRACT

According to the present invention there is provided an ammonia synthesis method using solar thermal energy, whereby it is possible to minimize the load of collecting solar thermal energy, and especially high-temperature solar thermal energy. The method of the present invention for synthesis of ammonia using solar thermal energy includes the following steps (a) to (c): (a) conducting ammonia synthesis reaction in which nitrogen and hydrogen are reacted to synthesize ammonia, (b) heating a heating medium by solar thermal energy and the reaction heat energy of the ammonia synthesis reaction, and (c) conducting at least part of the water splitting reaction in which water is split into hydrogen and oxygen, using the thermal energy of the heated heating medium, to obtain the hydrogen.

10 Claims, 4 Drawing Sheets

(52) U.S. Cl.
CPC ........... *Y02E 60/364* (2013.01); *Y02P 20/134* (2015.11); *Y02P 20/52* (2015.11)

(56) References Cited

U.S. PATENT DOCUMENTS

| | | | | |
|---|---|---|---|---|
| 4,053,576 | A | * | 10/1977 | Fletcher ................. C01B 3/045 126/684 |
| 4,071,608 | A | * | 1/1978 | Diggs ...................... B01J 7/02 423/579 |
| 4,668,494 | A | | 5/1987 | Van Hook |
| 2005/0000825 | A1 | | 1/2005 | Nomura et al. |
| 2006/0022884 | A1 | | 2/2006 | Hayashi et al. |
| 2006/0228284 | A1 | * | 10/2006 | Schmidt ................. C01B 3/36 423/352 |
| 2008/0256952 | A1 | * | 10/2008 | Litwin ..................... C01B 3/08 60/641.8 |
| 2010/0003184 | A1 | * | 1/2010 | Nakamura ............. C01B 3/025 423/359 |
| 2011/0286907 | A1 | * | 11/2011 | Nakamura ............. C01B 3/025 423/359 |
| 2012/0100062 | A1 | * | 4/2012 | Nakamura ............. C01B 3/025 423/359 |
| 2012/0321551 | A1 | * | 12/2012 | Lemont .................. C01B 3/068 423/657 |
| 2013/0266504 | A1 | * | 10/2013 | Davis ..................... C01B 3/063 423/579 |
| 2013/0330269 | A1 | | 12/2013 | Takeshima et al. |
| 2015/0044121 | A1 | * | 2/2015 | Singh ...................... C01B 3/025 423/360 |

FOREIGN PATENT DOCUMENTS

| | | |
|---|---|---|
| JP | 2005-041764 A | 2/2005 |
| JP | 2007-218604 A | 8/2007 |
| JP | 2008-535768 A | 9/2008 |
| JP | 2009-197733 A | 9/2009 |
| JP | 2010-159194 A | 7/2010 |
| JP | 2011-505314 A | 2/2011 |
| JP | 2012-140290 A | 7/2012 |
| JP | 2013-241303 A | 12/2013 |
| WO | 2006/110422 A2 | 10/2006 |
| WO | 2009/070189 A1 | 6/2009 |
| WO | 2010/128682 A1 | 11/2010 |

OTHER PUBLICATIONS

Tagawa et al. "Catalytic Decomposition of Sulfuric Acid Using Metal Oxides as the Oxygen Generating Reaction in Thermochemical Water Splitting Process" International Journal of Hydrogen Energy, vol. 14, 1989, pp. 11-17.

Machida, M. et al., "Macroporous Supported Cu-V Oxide as a Promising Substitute of the Pt Catalyst for Sulfuric Acid Decomposition in Solar Thermochemical Hydrogen Production," Chemistry of Materials, 2012, pp. 557-561, vol. 24.

* cited by examiner

AMMONIA SYNTHESIS METHOD

TECHNICAL FIELD

The present invention relates to an ammonia synthesis method, and particularly to an ammonia synthesis method in which ammonia is synthesized from water and air using solar heat.

BACKGROUND ART

Ammonia is a compound that is highly important for industry, being not only used as a starting material for production of nitrogen fertilizers, nitric acid and urea, but also as a refrigerant for refrigerating machines, as a solvent, as metal refining material, and the like.

The Haber-Bosch process is generally used for production of ammonia, and normally synthesis is accomplished from nitrogen and hydrogen using an iron-based catalyst at a pressure of several hundred atmospheres and a temperature of 400° C. to 500° C.

The hydrogen used for production of ammonia is usually produced by steam reforming of hydrocarbon fuel, represented by the following formulas (A1) and (A2).

$$C_nH_m + nH_2O \rightarrow nCO + (n+m/2)H_2 \quad (A1)$$

$$CO + H_2O \rightarrow CO_2 + H_2 \quad (A2)$$

$$C_nH_m + 2nH_2O \rightarrow nCO_2 + (2n+m/2)H_2 \quad \text{Overall reaction:}$$

Thus, carbon dioxide is usually generated when producing hydrogen to be used for production of ammonia.

In recent years, however, it has become a major worldwide goal to limit generation of carbon dioxide, in consideration of problems such as global warming.

In this regard, there have been proposed methods for producing hydrogen without using hydrocarbon fuel, wherein thermal energy such as solar thermal energy or nuclear thermal energy is used to split water into hydrogen and oxygen (PATENT DOCUMENT 1, Non Patent Document 1).

As a method for producing hydrogen from water using thermal energy, there has been proposed a method known as the S—I (sulfur-iodine) cycle method, represented by the following formulas (B1) to (B3):

$$H_2SO_4(\text{liquid}) \rightarrow H_2O(\text{gas}) + SO_2(\text{gas}) + \tfrac{1}{2}O_2(\text{gas}) \quad (B1)$$

(Reaction temperature=about 950° C., ΔH=188.8 kJ/mol-$H_2$)

$$I_2(\text{liquid}) + SO_2(\text{gas}) + 2H_2O(\text{liquid}) \rightarrow 2HI(\text{liquid}) + H_2SO_4(\text{liquid}) \quad (B2)$$

(Reaction temperature=about 130° C., ΔH=−31.8 kJ/mol-$H_2$)

$$2HI(\text{liquid}) \rightarrow H_2(\text{gas}) + I_2(\text{gas}) \quad (B3)$$

(Reaction temperature=about 400° C., ΔH=146.3 kJ/mol-$H_2$)

The overall reaction in the S—I (sulfur-iodine) cycle method represented by formulas (B1) to (B3) above is as follows:

$$H_2O \rightarrow H_2 + \tfrac{1}{2}O_2$$

(ΔH=286.5 kJ/mol-$H_2$ (based on higher calorific value)
(ΔH=241.5 kJ/mol-$H_2$ (based on lower calorific value)

The reaction (B1) above can be divided into two elementary reactions of the following formulas (B1-1) and (B1-2):

$$H_2SO_4(\text{liquid}) \rightarrow H_2O(\text{gas}) + SO_3(\text{gas}) \quad (B1-1)$$

(Reaction temperature=about 300° C., ΔH=90.9 kJ/mol-$H_2$)

$$SO_3(\text{gas}) \rightarrow SO_2(\text{gas}) + \tfrac{1}{2}O_2(\text{gas}) \quad (B1-2)$$

(Reaction temperature=about 950° C., ΔH=97.9 kJ/mol-$H_2$)

In other words, producing hydrogen by the S—I cycle method requires the highest temperature for the sulfur trioxide ($SO_3$) decomposition reaction (B1-2), and it is not easy to obtain the high temperature required for this reaction.

For this problem, in Non Patent Document 1, solar thermal energy is used as a heat source, while natural gas is combusted, as necessary, to provide additional thermal energy.

It has also been proposed to use a platinum catalyst to lower the temperature required for the sulfur trioxide decomposition reaction (B1-2). However, it is known that when a platinum catalyst is used in this reaction, despite excellent properties being exhibited when the catalyst begins to be used, the oxygen generated by the reaction oxidizes the platinum, and forms coarse platinum particles, that result in lower catalytic activity. Also, because platinum catalysts are expensive, they are difficult to use on an industrial scale.

In this regard, Non Patent Document 2 proposes using a catalyst selected from the group consisting of platinum (Pt), chromium (Cr), iron (Fe) and their oxides, supported on an alumina support, in order to lower the temperature required for the sulfur trioxide decomposition reaction.

For the S—I cycle method, Patent Document 2 proposes, for the reaction (B2) above, i.e. for the reaction of obtaining hydrogen iodide and sulfuric acid from iodine, sulfur dioxide and water, conducting reaction between sulfur dioxide and water on the positive electrode side of a cation exchange membrane, and conducting reaction of iodine on the negative electrode side of a cation exchange membrane, to eliminate the subsequent separation procedure.

In addition to the S—I cycle method, other methods of splitting water into hydrogen and oxygen utilizing thermal energy include the Westinghouse cycle, the Ispra-Mark 13 cycle method and the Los Alamos Science Laboratory cycle method, but these methods also require decomposition of sulfur trioxide into sulfur dioxide and oxygen, as in formula (B1-2).

CITATION LIST

Patent Literature

[Patent Document 1] Japanese Unexamined Patent Publication No. 2007-218604
[Patent Document 2] Japanese Unexamined Patent Publication No. 2005-041764

Non-Patent Literature

[Non Patent Document 1] A. Giaconia, et al., International Journal of Hydrogen Energy, 32, 469-481(2007)
[Non Patent Document 2] H. Tagawa, et al., International Journal of Hydrogen Energy, 14, 11-17(1989)

SUMMARY OF THE INVENTION

Technical Problem

As explained above, when producing hydrogen by thermal splitting of water, it is important to lower the high temperatures necessary for the water splitting reaction and to more efficiently obtain such high temperatures, and much research is being conducted on this issue.

From an environmental standpoint, it is highly useful to utilize solar thermal energy in order to supply of such high-temperature heat. However, solar thermal energy collection efficiency is reduced with increasing temperature of the heat to be collected, and the cost of the necessary equipment tends to increase.

The problems involved in such hydrogen generation naturally arise as problems in the production of ammonia using hydrogen as starting material.

The present invention therefore provides an ammonia synthesis method using solar thermal energy, that can minimize the need for collection of solar thermal energy, and especially the need for collection of high-temperature solar thermal energy.

Solution to Problem

As a result of diligent research, the present inventors have achieved the following invention.

<1> An ammonia synthesis method using solar thermal energy, comprising the following steps (a) to (c):
(a) conducting ammonia synthesis reaction in which nitrogen and hydrogen are reacted to synthesize ammonia,
(b) heating a heating medium by solar thermal energy and the reaction heat energy of the ammonia synthesis reaction, and
(c) conducting at least part of the water splitting reaction in which water is split into hydrogen and oxygen, using the thermal energy of the heated heating medium, to obtain the hydrogen.

<2> The method according to <1> above, wherein
in step (a), at least part of the ammonia synthesis reaction is conducted at a temperature of 550° C. or higher, and subsequently, at least part of the rest of the ammonia synthesis reaction is conducted at a temperature of below 550° C., and
in step (b), at least a portion of the heating medium is heated by the reaction heat energy of the ammonia synthesis reaction at a temperature of 550° C. or higher.

<3> The method according to <2> above, wherein in step (a), the nitrogen and hydrogen are heated by at least one of the following (i) to (iii) before the ammonia synthesis reaction at a temperature of 550° C. or higher:
(i) reaction heat of the ammonia synthesis reaction at a temperature of below 550° C.,
(ii) the heating medium heated by solar thermal energy, and
(iii) the heating medium after supplying thermal energy thereof to the water splitting reaction.

<4> The method according to <2> or <3> above, wherein in step (a), the hydrogen and the nitrogen are separately heated before the ammonia synthesis reaction at a temperature of 550° C. or higher.

<5> The method according to any one of <1> to <4> above, wherein in step (b), a first portion of the heating medium is heated by both the solar thermal energy and the reaction heat energy of the ammonia synthesis reaction.

<6> The method according to any one of <1> to <5> above, wherein in step (b), a second portion of the heating medium is heated by the reaction heat energy of the ammonia synthesis reaction, and is not heated by the solar thermal energy.

<7> The method according to any one of <1> to <6> above, wherein in step (b), a third portion of the heating medium is heated by the solar thermal energy, and is not heated by reaction heat energy of the ammonia synthesis reaction.

<8> The method according to any one of <1> to <7> above, wherein the solar thermal energy used in step (b) is obtained by a parabolic dish-type collector, a solar tower-type collector, a parabolic trough-type collector, or a combination thereof.

<9> The method according to any one of <1> to <8> above, wherein the water splitting reaction in step (c) comprises decomposition of sulfuric acid into water, sulfur dioxide and oxygen by the following reaction (X1), and the elementary reaction (X1-2) among the elementary reactions (X1-1) and (X1-2) of the reaction (X1) is conducted at a temperature of no higher than 800° C. using a sulfur trioxide decomposition catalyst.

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

<10> The method according to <9> above, wherein the water splitting reaction of step (c) is the S—I cycle method, Westinghouse cycle method, Ispra-Mark 13 cycle method or Los Alamos Science Laboratory cycle method.

<11> The method according to <9> or <10> above, wherein the sulfur trioxide decomposition catalyst used in the water splitting reaction of step (c) comprises a complex oxide of vanadium and at least one metal selected from the group consisting of transition metals and rare earth elements.

Effects of the Present Invention

According to the ammonia synthesis method of the present invention using solar heat, the need for collection of solar thermal energy, and especially high-temperature solar thermal energy can be minimized.

DESCRIPTION OF EMBODIMENTS

Ammonia Synthesis Method

The ammonia synthesis method of the present invention comprises the following steps (a) to (c):
(a) conducting ammonia synthesis reaction in which nitrogen and hydrogen are reacted to synthesize ammonia,
(b) heating a heating medium by solar thermal energy and the reaction heat energy of the ammonia synthesis reaction, and (c) conducting at least a part of the water splitting reaction in which water is split into hydrogen and oxygen, using the thermal energy of the heated heating medium, to obtain the hydrogen.

According to this method of the present invention, the thermal energy to be used in the water splitting reaction of step (c) can be obtained as a combination of solar thermal energy and the reaction heat energy of the ammonia synthesis reaction.

Particularly, according to this method of the present invention, because at least a portion of the high-temperature thermal energy among the thermal energy to be used in the water splitting reaction of step (c) can be obtained with the reaction heat energy of ammonia synthesis reaction at high temperature, the temperature of solar thermal energy that must be collected can be decreased, and/or the amount of high-temperature thermal energy that must be collected from the solar thermal energy can be reduced.

As mentioned above, as temperature of the heat to be collected increases, solar thermal energy collection efficiency is reduced and the cost of the necessary equipment tends to increase. Therefore, such lowering of the temperature of the solar thermal energy to be collected is preferred in terms of the overall efficiency of the ammonia synthesis reaction and the initial cost for the required production equipment.

Figure 1:
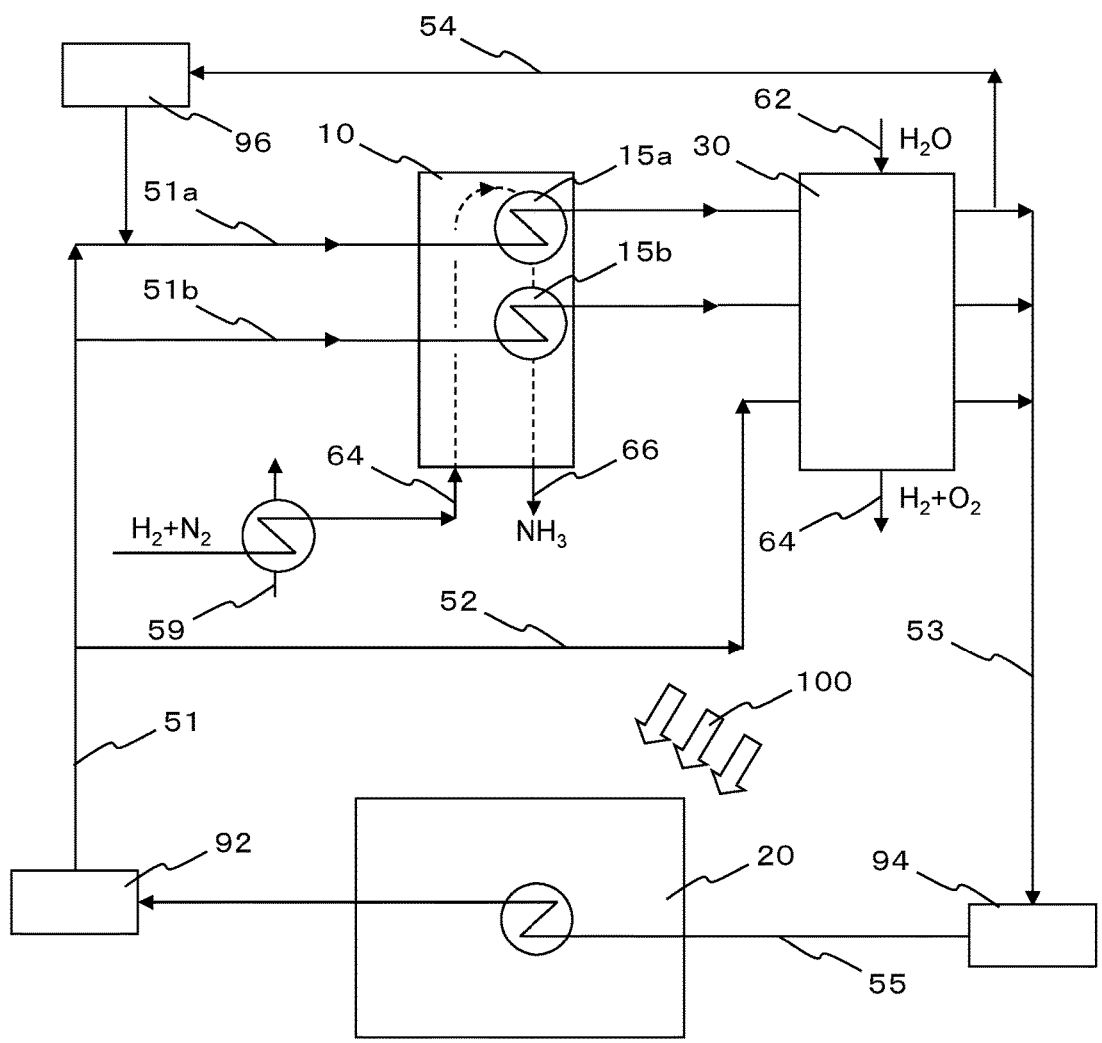
FIG. 1 is a conceptual drawing of an ammonia synthesis apparatus to be used in the method of the present invention.

This method of the present invention can be carried out using the ammonia synthesis apparatus shown in FIG. 1, for example. In view of the embodiment shown in FIG. 1, the steps (a) to (c) of the method of the present invention will be explained below, but the present invention is not limited to the specific embodiment shown in FIG. 1.

<Step (a)>

In step (a), nitrogen and hydrogen ($N_2+H_2$), that are supplied as indicated by the arrow 64, are reacted in the ammonia synthesis reactor 10 to synthesize ammonia, and the ammonia ($NH_3$) is recovered as indicated by the arrow 66.

In this step (a), at least part of the ammonia synthesis reaction may be conducted at a temperature of 550° C. or higher, 600° C. or higher, 650° C. or higher or 700° C. or higher, and then at least part of the rest of the ammonia synthesis reaction may be conducted at a temperature of below 550° C., 530° C. or less, or 510° C. or less.

If at least part of the ammonia synthesis reaction is conducted at a relatively high temperature and then at least part of the rest of the ammonia synthesis reaction is conducted at relatively low temperature in this manner, it will be possible to obtain relatively high-temperature heat in the reaction conducted at relatively high temperature, and to achieve a relatively high conversion rate in the reaction conducted at relatively low temperature.

Figure 3:
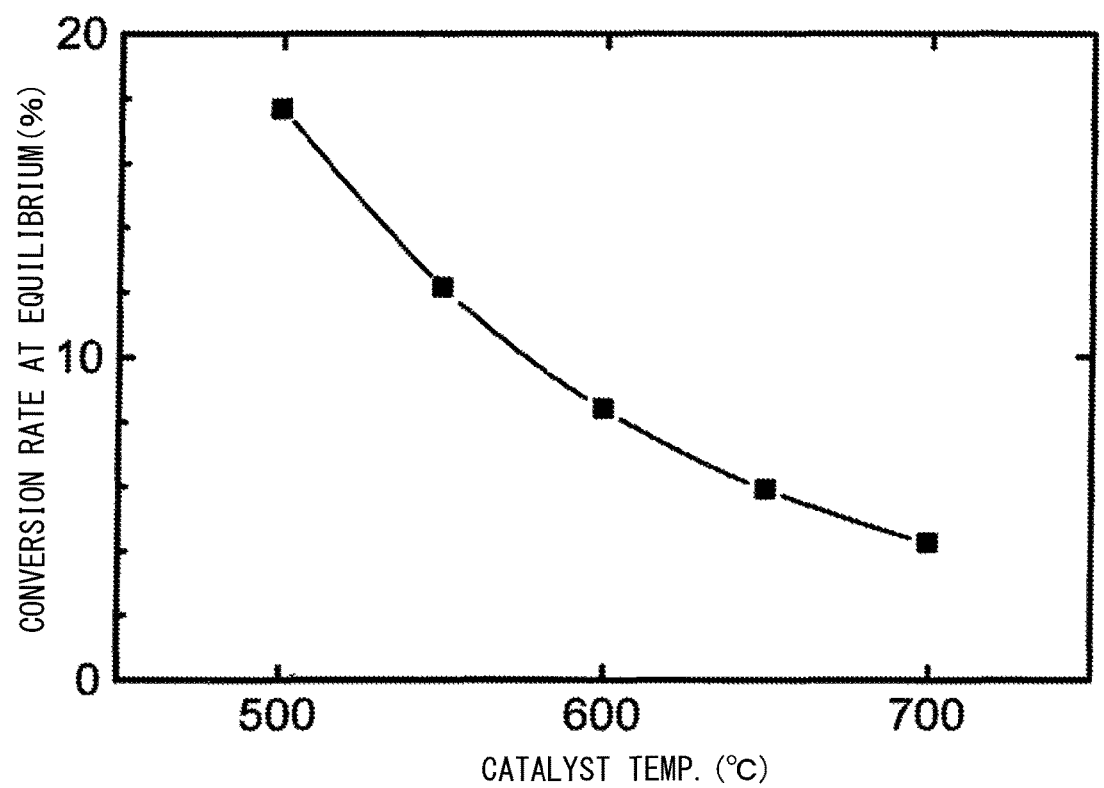
FIG. 3 is a diagram showing temperature dependency of the equilibrium conversion rate in a reaction of synthesizing ammonia from nitrogen and hydrogen.

This is because the ammonia synthesis reaction from nitrogen and hydrogen represented by the following formula is an exothermic reaction, and as illustrated in FIG. 3, the equilibrium conversion rate of the ammonia generating reaction increases with lower reaction temperature:

$$\tfrac{1}{2}N_2 + \tfrac{3}{2}H_2 \rightarrow NH_3$$

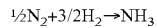

($\Delta H_0 = -45.9$ kJ/mol-$NH_3$)

FIG. 3 shows the catalyst temperature (° C.) dependency of the equilibrium conversion rate (%) of the ammonia generating reaction at a pressure of 200 atmospheres.

Specifically, for example, when at least part of the ammonia synthesis reaction is first conducted at 700° C., the equilibrium conversion rate of the reaction is as low as 4.32% as shown in FIG. 3, but its high-temperature reaction heat can be obtained. Then, when at least part of the rest of the ammonia synthesis reaction is subsequently conducted at 500° C., the temperature of the obtained reaction heat is low, but the equilibrium conversion rate is as high as 17.65%, and therefore the reaction can proceed further even after the reaction at 700° C.

Before the ammonia synthesis reaction at a temperature of 550° C. or higher, the nitrogen and hydrogen may be heated by at least one of the following (i) to (iii):

(i) the reaction heat of the ammonia synthesis reaction at a temperature of below 550° C., (ii) the heating medium 59 that has been heated by solar thermal energy, and (iii) the heating medium 59 after supplying thermal energy thereof to the water splitting reaction.

The channel of heating medium 59 in FIG. 1 is not specifically illustrated, but it may be connected to a channel of heating medium capable of heating nitrogen and hydrogen, such as a channel of heating medium which has been heated by solar heat, or a channel of heating medium which had supplied heat thereof to the water splitting reaction.

When such heating is carried out, preferably no reaction takes place between nitrogen and hydrogen during the heating. This is because, as mentioned above, the synthesis reaction of ammonia from nitrogen and hydrogen has a higher equilibrium conversion rate at a lower reaction temperature, and therefore if nitrogen and hydrogen are reacted for the ammonia synthesis reaction to proceed during the heating, the ammonia synthesis reaction may not proceed sufficiently after heating.

Specifically, in order to inhibit ammonia synthesis reaction during the heating, the catalyst may be essentially absent during heating of the nitrogen and hydrogen, or the nitrogen and hydrogen may be heated separately.

Figure 2:
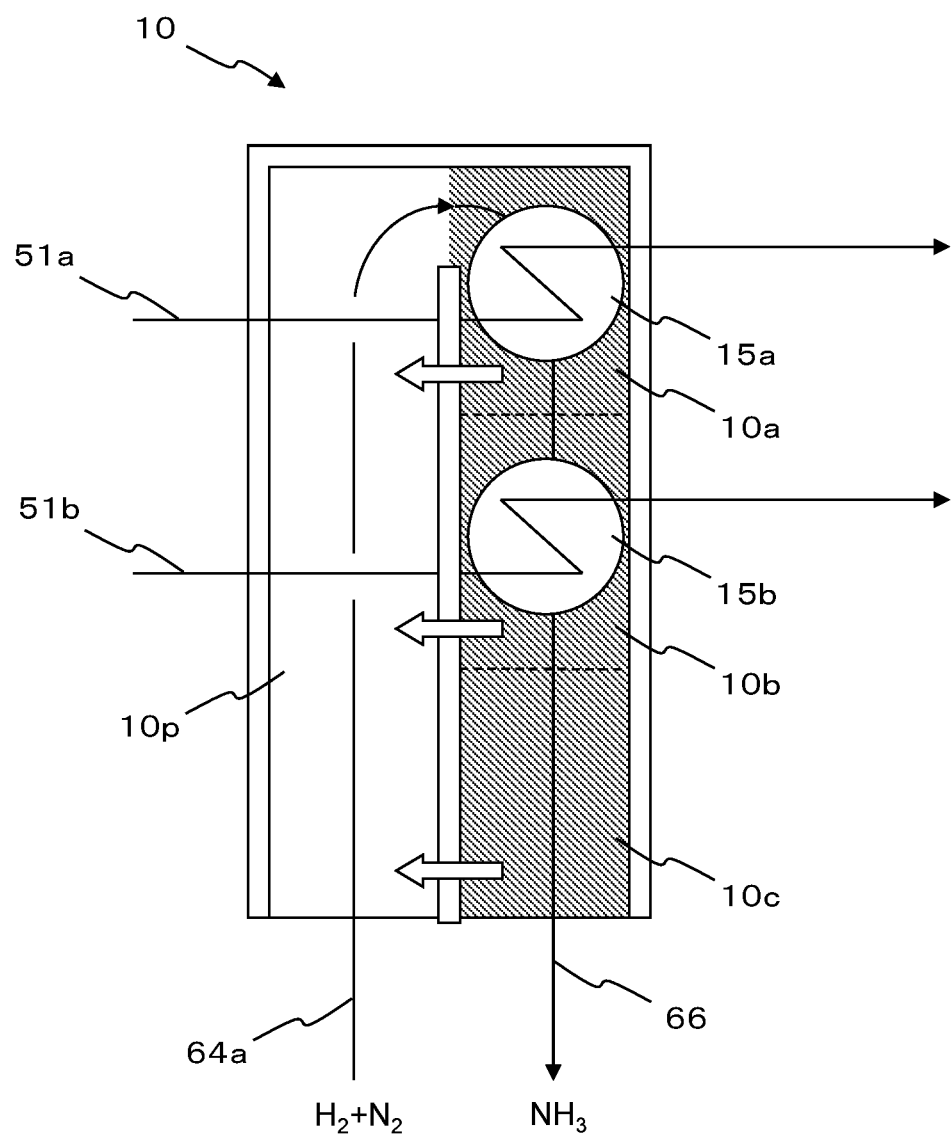
FIG. 2 is a schematic cross-sectional diagram of an ammonia synthesis reactor to be used in the ammonia synthesis apparatus shown in FIG. 1.

The ammonia synthesis reactor 10 used in step (a) may be as illustrated in FIG. 2, for example. Specifically, for example, as shown in FIG. 2, the ammonia synthesis reactor 10 may have the following (a-1) to (a-3), and optionally the following (a-4), wherein the reaction heat energy generated in the first reaction zone 10a heats the heating medium 51a via a heat exchanger 15a which is thermally connected to the ammonia synthesis reactor 10:

(a-1) a heating zone 10p that receives supply of heat from the reaction zone as indicated by the white arrow, and heats the nitrogen and hydrogen, (a-2) a first reaction zone 10a in which the heated nitrogen and hydrogen are reacted at a temperature of 550° C. or higher, (a-3) a second reaction zone 10b to which outflow from the first reaction zone is supplied, wherein the nitrogen and hydrogen in the outflow is reacted at a temperature of below 550° C., and (a-4) a third reaction zone 10c to which outflow from the second reaction zone is supplied, wherein the nitrogen and hydrogen in the outflow is reacted at a lower temperature than the second reaction zone.

In the ammonia synthesis reactor 10, the heating medium 51b may optionally be heated, via a heat exchanger 15b, by reaction heat energy generated at the second reaction zone 10b.

While not shown in the drawing, a heat exchanger may also optionally be situated in the third reaction zone 10c of the ammonia synthesis reactor 10, and the heating medium heated via this heat exchanger.

The nitrogen used in the ammonia synthesis method of the present invention can be obtained by any method such as cryogenic separation of air.

<Step (b)>

In step (b), solar thermal energy 100 is collected at the solar collector 20 and the heating medium of the heating medium channel 55 is heated.

Also, in step (b), the heat exchangers 15a and 15b are used to heat the heating medium in the heating medium channels 51a and 51b by reaction heat energy of the ammonia synthesis reaction in the ammonia synthesis reactor 10.

At least a portion of the heating medium can be heated by the reaction heat energy of the ammonia synthesis reaction at a temperature of 550° C. or higher. This can reduce or eliminate the need to heat the heating medium to a temperature of 550° C. or higher by solar thermal energy.

In step (b), at least a portion of the heating medium can be heated by either or both solar thermal energy collected by the solar collector 20 and reaction heat energy of the ammonia synthesis reaction in the ammonia synthesis reactor 10.

Specifically, for example, a first portion of the heating medium may be heated by both solar thermal energy collected by the solar collector 20 and reaction heat energy of the ammonia synthesis reaction in the ammonia synthesis reactor 10, as indicated by the heating medium channels 51, 51a, 51b, 53 and 55.

Also, for example, a second portion of the heating medium, such as the portion heated to the highest temperature, may be heated by reaction heat energy of the ammonia synthesis reaction in the ammonia synthesis reactor 10, and not heated by solar thermal energy collected at the solar collector 20, as indicated by the heating medium channels 54 and 51a. Also, for example, a third portion of the heating medium, such as the portion heated to the lowest temperature, may be heated by solar thermal energy collected at the solar collector 20, and not heated by reaction heat energy of the ammonia synthesis reaction, as indicated by the heating medium channels 52, 53, 55 and 51.

Preferably, heating medium tanks 92, 94 and 96 are optionally disposed in the heating medium channels in order to allow temporary storage of the heating medium.

The solar thermal energy used for heating of the heating medium may be obtained by a parabolic dish-type collector, a solar tower-type collector, a parabolic trough-type collector, or combinations thereof. Among these, a parabolic trough-type collector has a simple construction, low cost and suitability for large-scale plants, although it cannot easily provide high temperatures in comparison with other types. In this regard, since a high temperature can be supplied by the ammonia synthesis reaction in the method of the present invention, the method of the present invention is particularly suitable when such a parabolic dish-type collector is used for collection of solar thermal energy.

<Step (c)>

In step (c), the thermal energy of the heated heating medium is used in the water splitting reactor 30 to conduct at least part of the splitting reaction of water ($H_2O$) 62, for splitting of water into hydrogen and oxygen ($H_2+O_2$) 64.

The water splitting reaction may be a reaction that includes decomposition of sulfuric acid into water, sulfur dioxide and oxygen by the following reaction (X1), and the elementary reaction (X1-2) among the elementary reactions (X1-1) and (X1-2) of the reaction (X1) may be conducted at a temperature of 800° C. or less, 750° C. or less, 700° C. or less, 650° C. or less, and 600° C. or less, using a sulfur trioxide decomposition catalyst:

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

As methods for splitting water into hydrogen and oxygen by the elementary reaction (X1-2), there are known the S—I cycle method, Westinghouse cycle method, Ispra-Mark 13 cycle method, Los Alamos Science Laboratory cycle method, etc.

Specifically, the water splitting reaction of step (c) may be accomplished by the S—I (sulfur-iodine) cycle method represented by the following formulas (X1) to (X3), and at least a portion of the thermal energy for the reaction may be supplied by thermal energy of the heated heating medium.

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

$$I_2 + SO_2 + 2H_2O \rightarrow 2HI + H_2SO_4 \quad (X2)$$

$$2HI \rightarrow H_2 + I_2 \quad (X3)$$

Total reaction: $H_2O \rightarrow H_2 + \tfrac{1}{2}O_2$

Also, for example, the water splitting reaction of step (c) may be accomplished by the Westinghouse cycle method represented by the following formulas (X1), (X4) and (X5), and at least a portion of the thermal energy for the reaction may be supplied by thermal energy of the heated heating medium:

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

$$SO_2 + 2H_2O \rightarrow H_2SO_3 \quad (X4)$$

$$H_2SO_3 + H_2O + \rightarrow H_2 + H_2SO_4 \text{(electrolysis)} \quad (X5)$$

Total reaction: $H_2O \rightarrow H_2 + \tfrac{1}{2}O_2$

Also, for example, the water splitting reaction of step (c) may be accomplished by the Ispra-Mark 13 cycle method represented by the following formulas (X1), (X6) and (X7), and at least a portion of the thermal energy for the reaction may be supplied by thermal energy of the heated heating medium:

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

$$2HBr \rightarrow Br_2 + H_2 \quad (X6)$$

$$Br_2 + SO_2 + 2H_2O \rightarrow 2HBr + H_2SO_4 \quad (X7)$$

Total reaction: $H_2O \rightarrow H_2 + \tfrac{1}{2}O_2$

Also, for example, the water splitting reaction of step (c) may be accomplished by the Los Alamos Science Laboratory cycle method represented by the following formulas (X1), and (X8) to (X10), and at least a portion of the thermal energy for the reaction may be supplied by thermal energy of the heated heating medium:

$$H_2SO_4 \rightarrow H_2O + SO_2 + \tfrac{1}{2}O_2 \quad (X1)$$

$$H_2SO_4 \rightarrow H_2O + SO_3 \quad (X1\text{-}1)$$

$$SO_3 \rightarrow SO_2 + \tfrac{1}{2}O_2 \quad (X1\text{-}2)$$

$$Br_2 + SO_2 + 2H_2O \rightarrow 2HBr + H_2SO_4 \quad (X8)$$

$$2CrBr_3 \rightarrow 2CrBr_2 + Br_2 \quad (X9)$$

$$2HBr + 2CrBr_2 \rightarrow 2CrBr_3 + H_2 \quad (X10)$$

Total reaction: $H_2O \rightarrow H_2 + \tfrac{1}{2}O_2$

The sulfur trioxide decomposition catalyst used for the elementary reaction (X1-2) may be a complex oxide of vanadium and at least one metal selected from the group consisting of transition metals and rare earth elements.

EXAMPLES

The following reference examples and reference comparative examples demonstrate that, using a catalyst that is a complex oxide of vanadium and at least one metal selected from the group consisting of transition metals and rare earth elements, and especially a catalyst that is a complex metal oxide of copper (Cu) and vanadium (V), it is possible to promote the elementary reaction (X1-2) using thermal energy of 650° C., which is the temperature obtainable by the ammonia synthesis reaction.

Reference Example 1

In Reference Example 1, a complex metal oxide (Cu-V-O) of copper (Cu) and vanadium (V) was used as a unsupported catalyst.
(Production of Unsupported Catalyst)
The unsupported catalyst of Reference Example 1 was obtained by pulverizing copper oxide and vanadium oxide with a mortar, in a metal atomic ratio of 1:1, thoroughly mixing them, placing the obtained mixture in an alumina crucible, and firing it at 750° C. for 12 hours.

Reference Comparative Example 1

In Reference Comparative Example 1, copper (Cu) oxide (Cu—O) was used as a unsupported catalyst. The copper oxide used as starting material in Reference Example 1 was directly used as the unsupported catalyst.

Reference Comparative Example 2

In Reference Comparative Example 2, vanadium (V) oxide (V—O) was used as a unsupported catalyst. The vanadium oxide used as starting material in Reference Example 1 was directly used as the unsupported catalyst.

Reference Comparative Example 3

In Reference Comparative Example 3, no catalyst was used.
(Evaluation (Conversion Rate))
The fixed bed flow reactor shown in FIG. 4 was used to evaluate the conversion rate in the following sulfur trioxide decomposition reaction (X1-2), for the unsupported catalysts of Reference Example 1 and Reference Comparative Examples 1 to 3.

$$SO_3 \rightarrow SO_2 + \tfrac{1}{2}O_2 \quad (X1\text{-}2)$$

Figure 4:
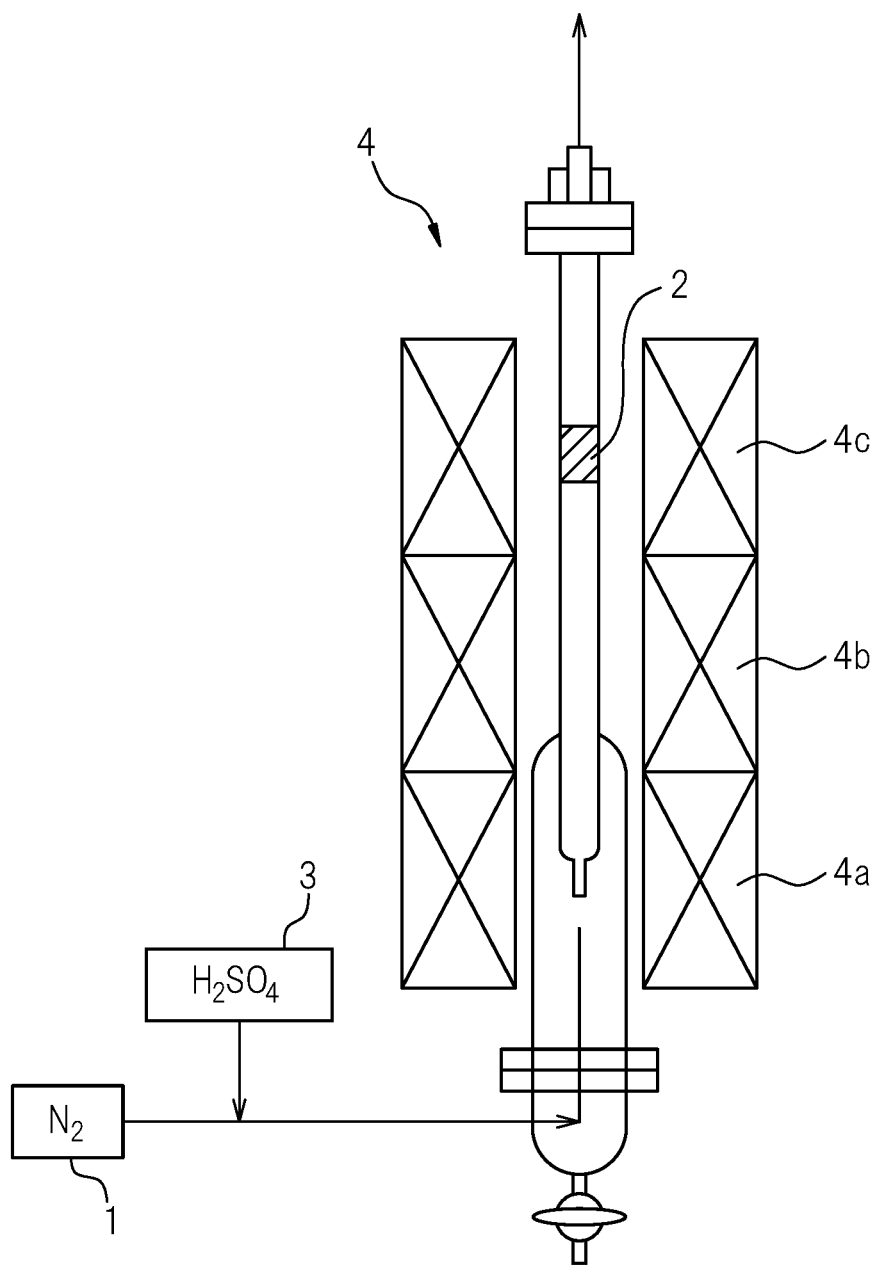
FIG. 4 is a diagram showing an apparatus used for evaluation of the sulfur trioxide decomposition catalysts of the reference examples and reference comparative examples.

Specifically, the conversion rate in the sulfur trioxide decomposition reaction was evaluated according to the following explanation based on FIG. 4.

A 0.5 g portion of the unsupported catalyst or support catalyst adjusted to 14-20 mesh was packed into a quartz reaction tube 4 (inner diameter: 10 mm) as a catalyst bed 10. Nitrogen ($N_2$) (100 mL/min) and a 47 mass % sulfuric acid ($H_2SO_4$) aqueous solution (50 μL/min) were supplied from a nitrogen feeder 1 and sulfuric acid feeder 3 to the lower level of the quartz reaction tube 4.

The sulfuric acid ($H_2SO_4$) supplied to the lower level of the quartz reaction tube 4 was heated at the lower level and middle of the quartz reaction tube 4 to be decomposed to sulfur trioxide ($SO_3$) and oxygen ($O_2$), and then allowed to flow into the catalyst bed 2 ($SO_3$: 4.5 mol %, $H_2O$: 31 mol %, $N_2$: balance, 0° C.-equivalent gas flow rate: 148.5 cm$^3$/min, weight/flow rate ratio (W/F ratio): 5.61×10$^{-3}$ g·h/cm$^3$, gas hourly space velocity (GHSV): about 15,000 h$^{-1}$).

The lower level of the quartz reaction tube 4 was heated to about 400° C. with a heater 4a, while the middle level was heated to about 600° C. with a heater 4b. Also, the upper level of the quartz reaction tube 4 was heated at first to about 600° C. with a heater 4c and then after reaching a steady state, it was heated to 650° C.

After heating the upper level of the quartz reaction tube 4 to 650° C. with the heater 4c, the gas flowing out from the quartz reaction tube 4 was allowed to air-cool and then bubbled through a 0.05 M iodine ($I_2$) solution, for absorption of sulfur dioxide ($SO_2$) into the iodine solution. A 0.025 M sodium thiosulfate ($Na_2S_2O_3$) solution was used for iodometric titration of the sulfur dioxide-adsorbed iodine solution, to determine the amount of absorbed sulfur dioxide.

Also, the effluent gas bubbled through the iodine solution was cooled with a dry ice/ethanol mixture, the residual sulfur dioxide and sulfur trioxide were completely removed with mist absorber and silica gel, and then the amount of oxygen ($O_2$) was determined using a magnetic pressure oxygen analyzer (MPA3000 by Horiba, Ltd.) and a gas chromatograph (GC8A by Shimadzu Corp., Molecular Sieves 5A, TCD detector).

The percentage achievement to equilibrium conversion rate from sulfur trioxide ($SO_3$) to sulfur dioxide ($SO_2$) was calculated from the amounts of sulfur dioxide and oxygen determined as described above.

The evaluation results for the reference examples and reference comparative examples are shown in Table 1 below.

TABLE 1

| | Catalyst | Percentage Achievement to Conversion Rate (%) |
|---|---|---|
| Reference Example 1 | Cu—V—O | 51.7 |
| Reference Comparative Example 1 | Cu—O | 6.2 |
| Reference Comparative Example 2 | V—O | 22.3 |
| Reference Comparative Example 3 | None | (No conversion) |

From Table 1, it is understood that the catalyst of Reference Example 1, which was a complex oxide of vanadium and at least one metal selected from the group consisting of transition metals and rare earth elements, can promote the elementary reaction (X1-2) with use of thermal energy of 650° C., which is the temperature obtainable by the ammonia synthesis reaction.

EXPLANATION OF SYMBOLS

10 Ammonia synthesis reactor
10a First reaction zone
10b Second reaction zone
10c Third reaction zone
15a, 15b Heat exchangers
10p Heating zone
20 Solar collector
30 Water splitting reactor
51, 51a, 51b, 52, 53, 54, 55, 59 Heating media
92, 94, 96 Heating medium tanks

The invention claimed is:

1. An ammonia synthesis method using solar thermal energy,
wherein the method comprises the following steps:
(a) conducting ammonia synthesis reaction in which nitrogen and hydrogen are reacted to synthesize ammonia,
(b) heating a heating medium by solar thermal energy and the reaction heat energy of the ammonia synthesis reaction, and
(c) conducting at least part of the water splitting reaction in which water is split into hydrogen and oxygen, using the thermal energy of the heated heating medium, to obtain the hydrogen; and
wherein
in step (a), at least part of the ammonia synthesis reaction is conducted at a temperature of 550° C. or higher, and subsequently, at least part of the rest of the ammonia synthesis reaction is conducted at a temperature of below 550° C., and
in step (b), at least a portion of the heating medium is heated by the reaction heat energy of the ammonia synthesis reaction at a temperature of 550° C. or higher.

2. The method according to claim 1, wherein in step (a), the nitrogen and hydrogen are heated by at least one of the following (i) to (iii) before the ammonia synthesis reaction at a temperature of 550° C. or higher:
(i) reaction heat of the ammonia synthesis reaction at a temperature of below 550° C.,
(ii) the heating medium heated by solar thermal energy, and
(iii) the heating medium after supplying thermal energy thereof to the water splitting reaction.

3. The method according to claim 1, wherein in step (a), the hydrogen and the nitrogen are separately heated before the ammonia synthesis reaction at a temperature of 550° C. or higher.

4. The method according to claim 1, wherein in step (b), a first portion of the heating medium is heated by both the solar thermal energy and the reaction heat energy of the ammonia synthesis reaction.

5. The method according to claim 1, wherein in step (b), a second portion of the heating medium is heated by the reaction heat energy of the ammonia synthesis reaction, and is not heated by the solar thermal energy.

6. The method according to claim 1, wherein in step (b), a third portion of the heating medium is heated by the solar thermal energy, and is not heated by reaction heat energy of the ammonia synthesis reaction.

7. The method according to claim 1, wherein the solar thermal energy used in step (b) is obtained by a parabolic dish-type collector, a solar tower-type collector, a parabolic trough-type collector, or a combination thereof.

8. The method according to claim 1, wherein the water splitting reaction in step (c) comprises decomposition of sulfuric acid into water, sulfur dioxide and oxygen by the following reaction (X1), and the elementary reaction (X1-2) among the elementary reactions (X1-1) and (X1-2) of the reaction (X1) is conducted at a temperature of no higher than 800° C. using a sulfur trioxide decomposition catalyst $$H_2SO_4 \rightarrow H_2O + SO_2 + \tfrac{1}{2}O_2 \tag{X1}$$

$$H_2SO_4 \rightarrow H_2O + SO_3 \tag{X1-1}$$

$$SO_3 \rightarrow SO_2 + \tfrac{1}{2}O_2 \tag{X1-2}.$$

9. The method according to claim 8, wherein the water splitting reaction of step (c) is the S—I cycle method, Westinghouse cycle method, Ispra-Mark 13 cycle method or Los Alamos Science Laboratory cycle method.

10. The method according to claim 8, wherein the sulfur trioxide decomposition catalyst used in the water splitting reaction of step (c) comprises a complex oxide of vanadium and at least one metal selected from the group consisting of transition metals and rare earth elements.

* * * * *